Figure 1:
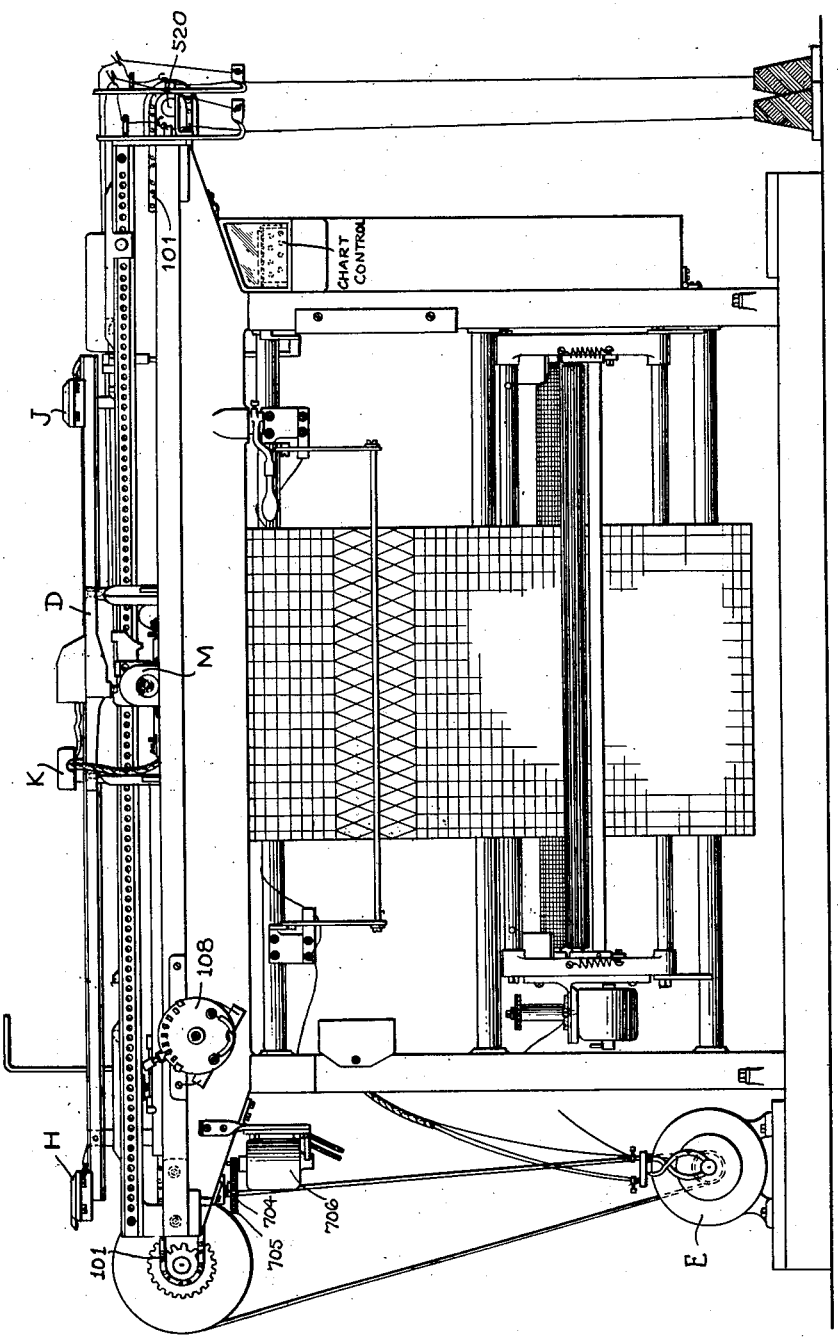

Feb. 2, 1926. 1,571,765
W. FELS
PATTERN CHANGE MECHANISM FOR KNITTING MACHINES
Original Filed July 8, 1920 13 Sheets-Sheet 1

Inventor
William Fels
By his Attorneys
Emery Varney Blair & Hoquet

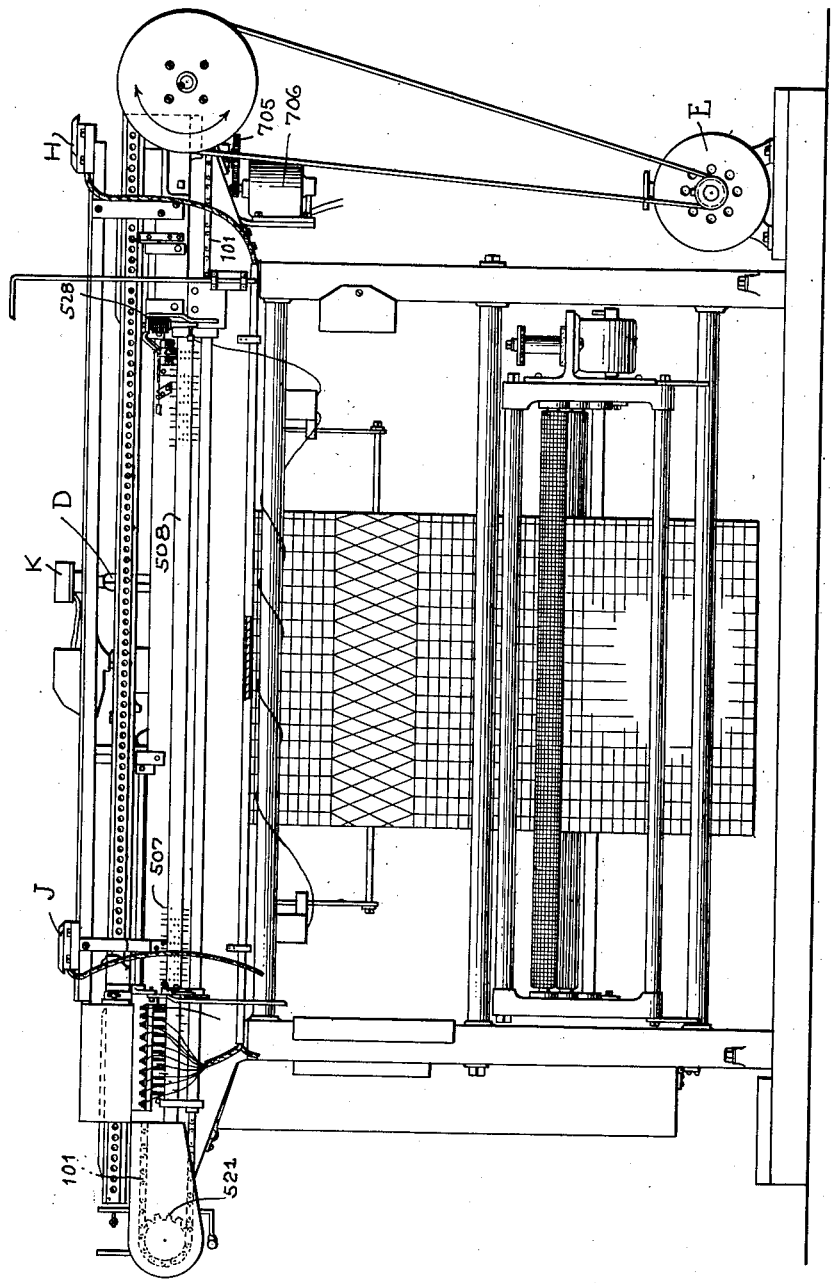

Feb. 2, 1926. 1,571,765
W. FELS
PATTERN CHANGE MECHANISM FOR KNITTING MACHINES
Original Filed July 8, 1920 13 Sheets-Sheet 3
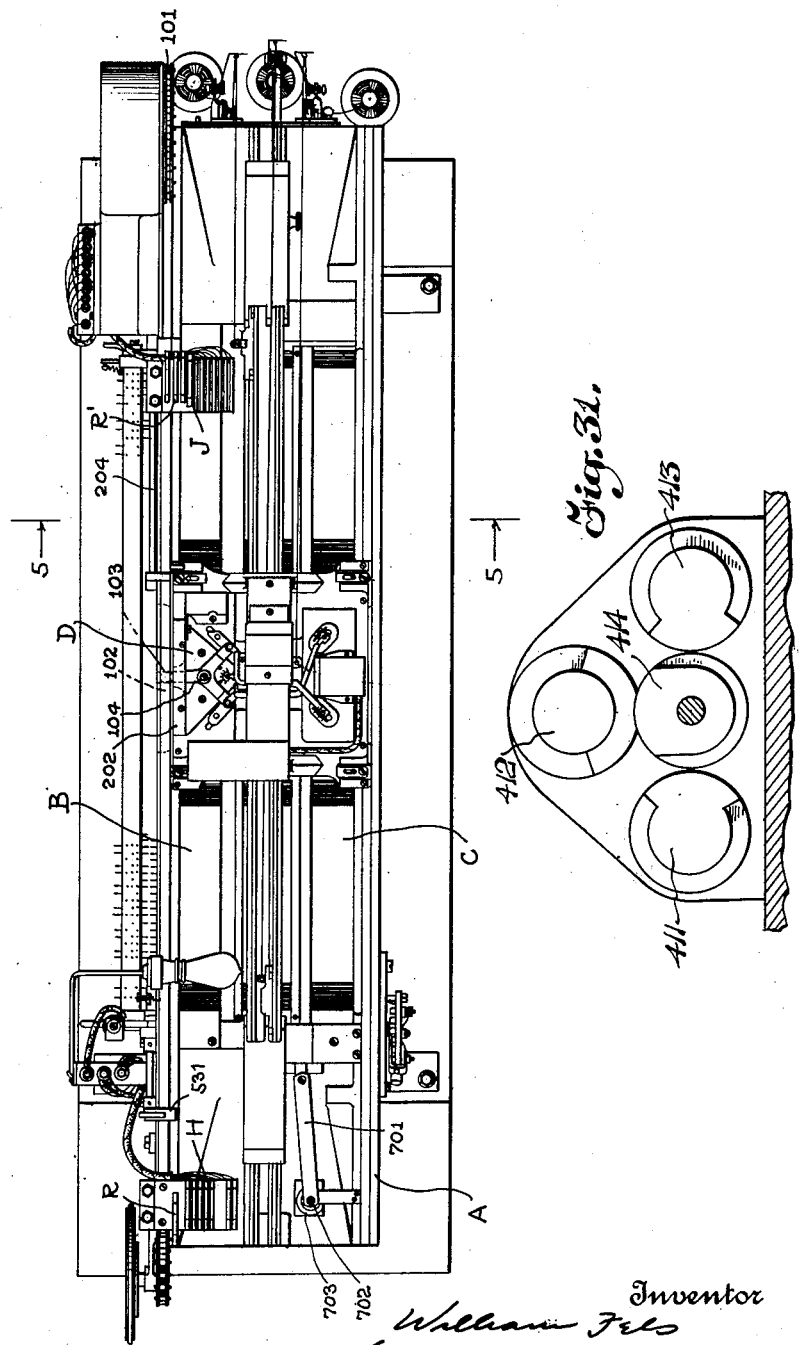

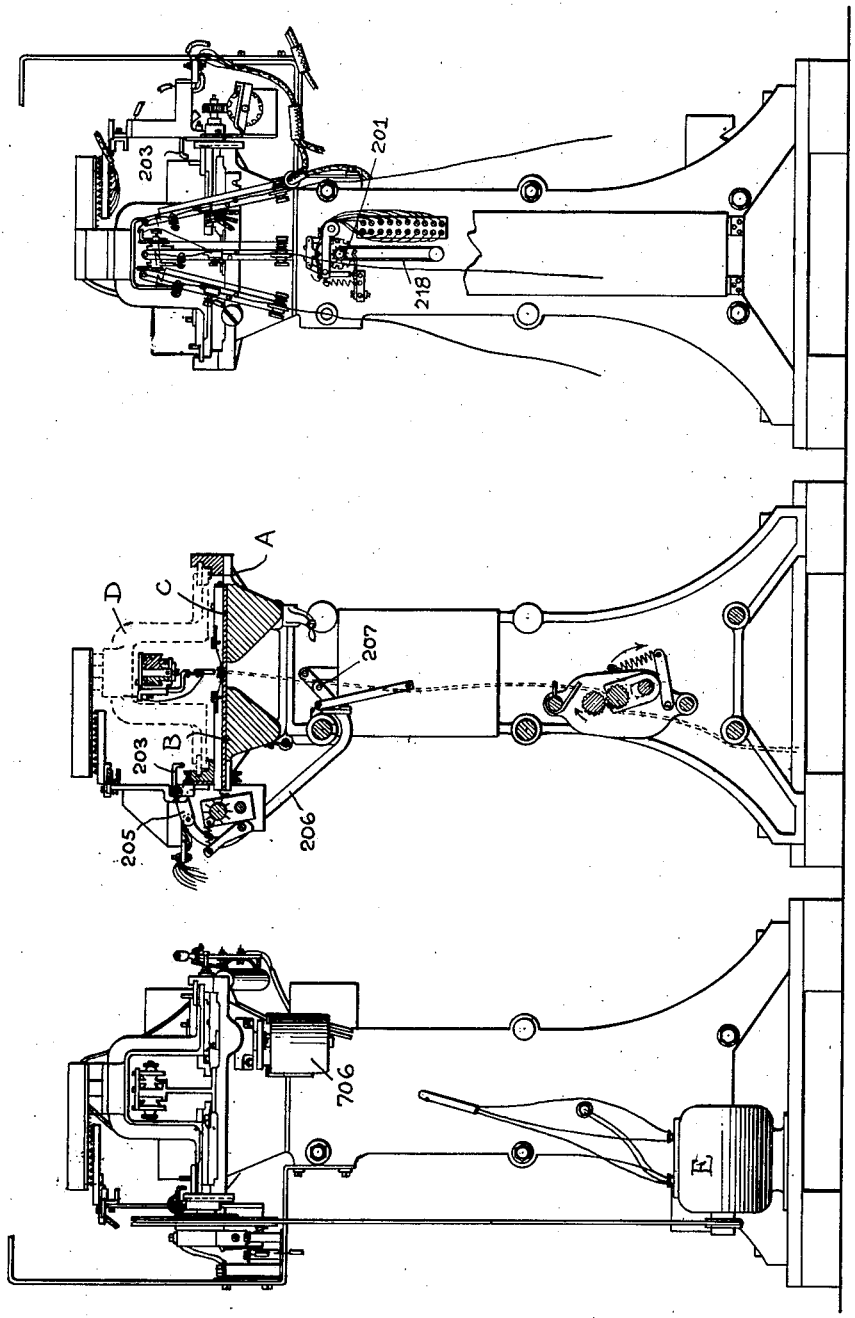

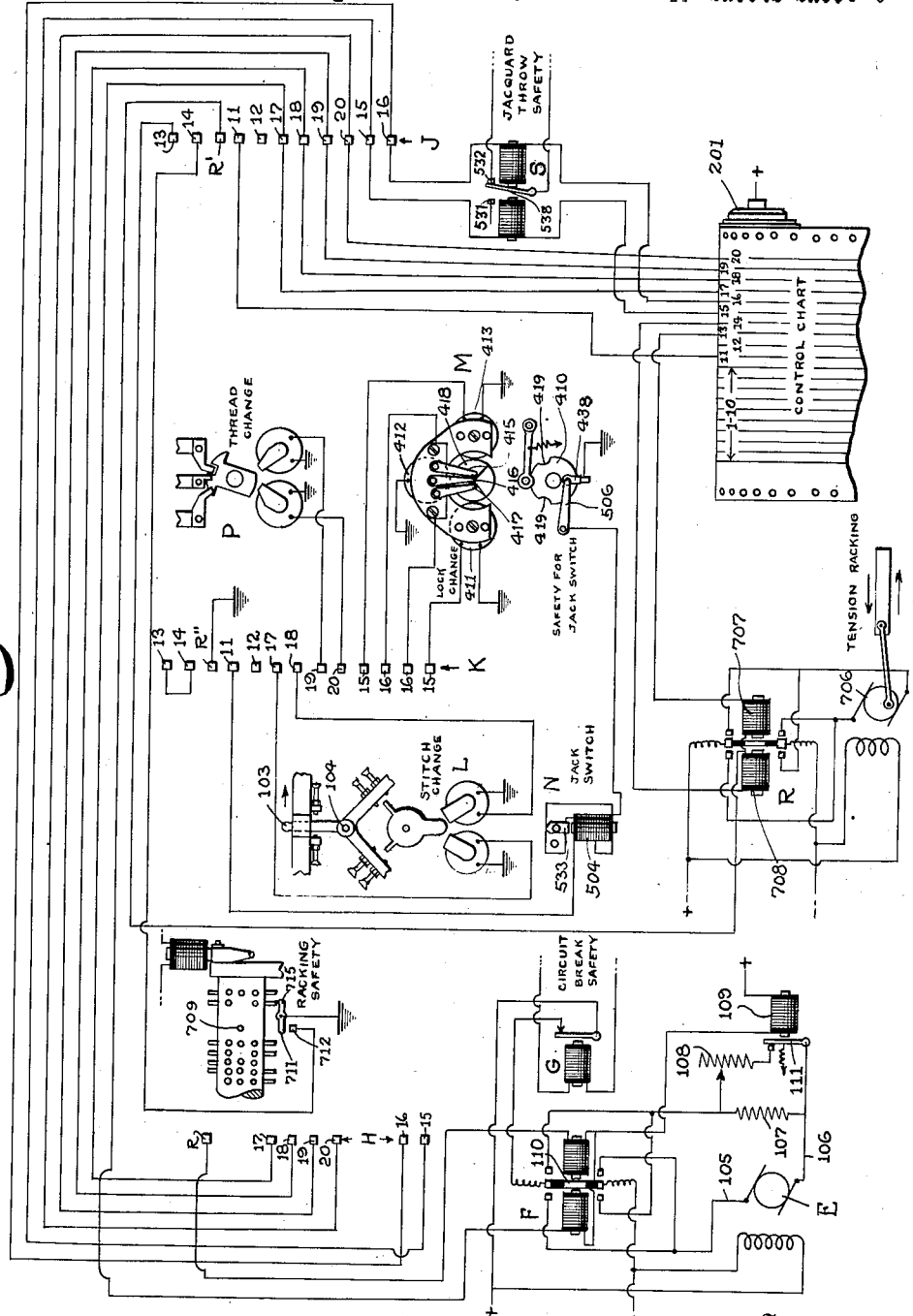

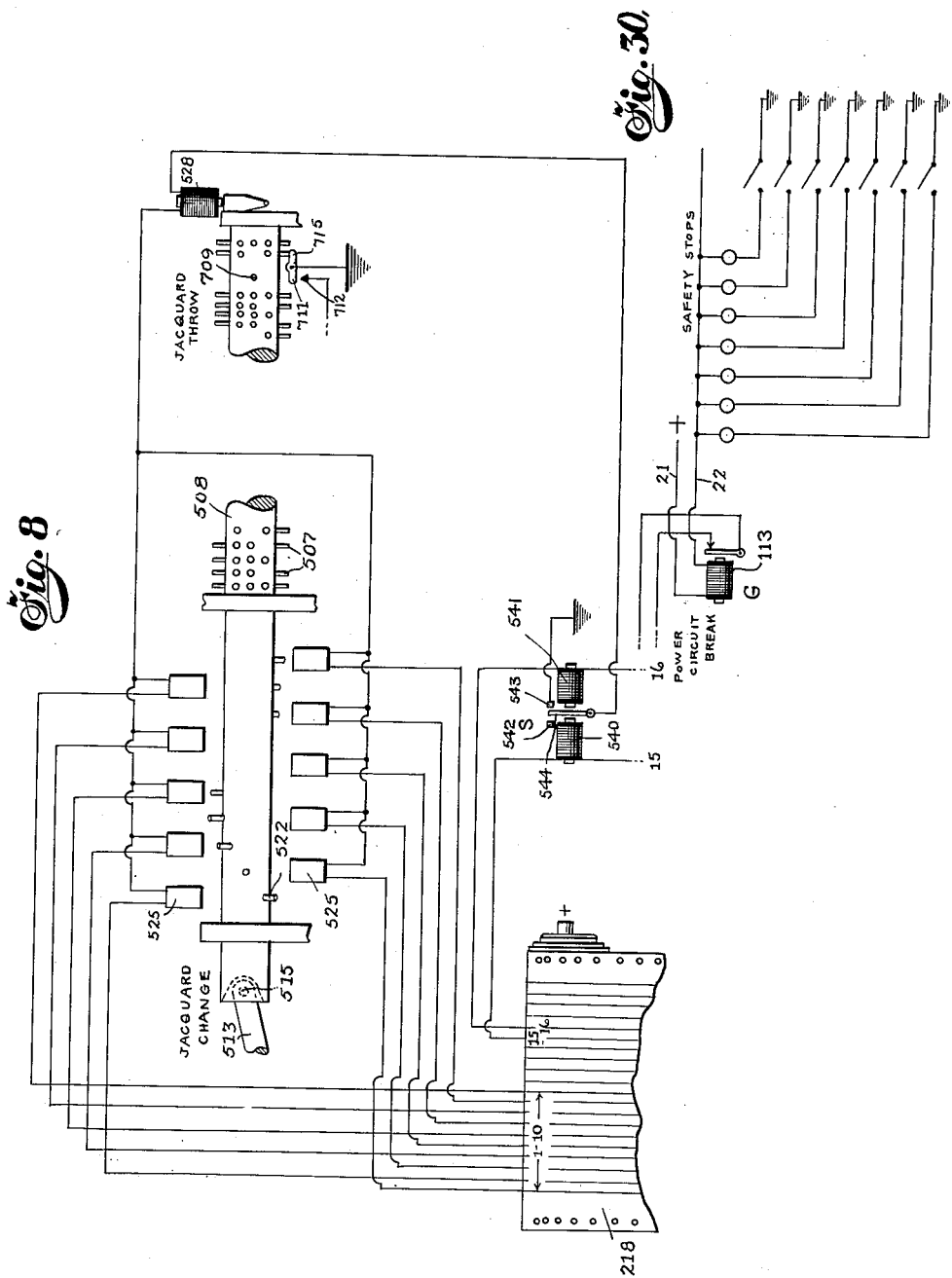

Feb. 2, 1926. 1,571,765
W. FELS
PATTERN CHANGE MECHANISM FOR KNITTING MACHINES
Original Filed July 8, 1920 13 Sheets-Sheet 7
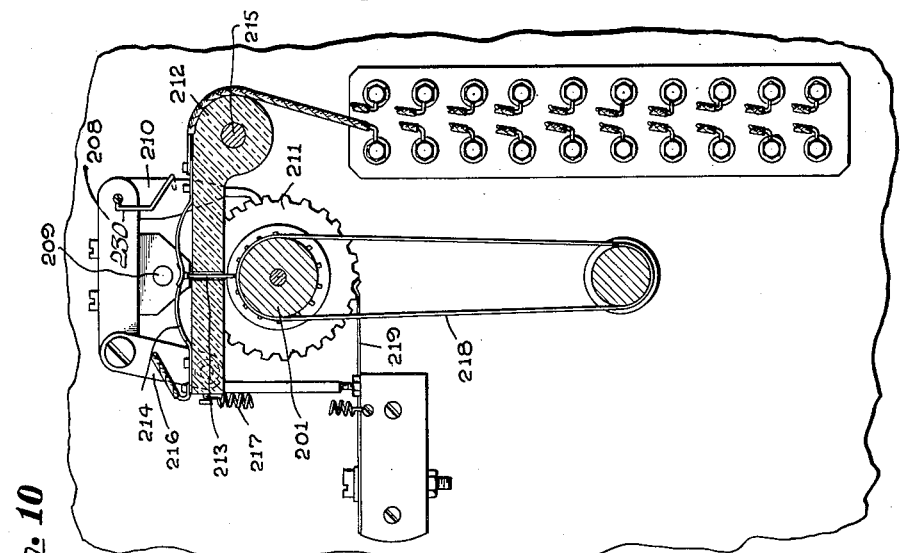
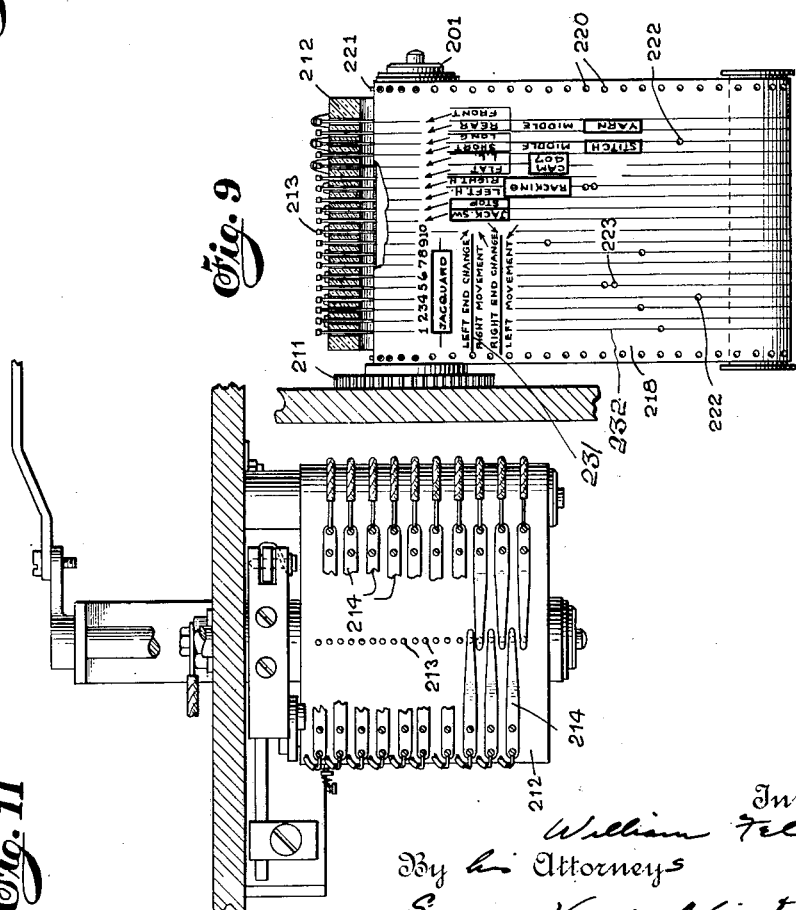
Inventor
William Fels
By his Attorneys
Emery, Varney, Blair & Hequet

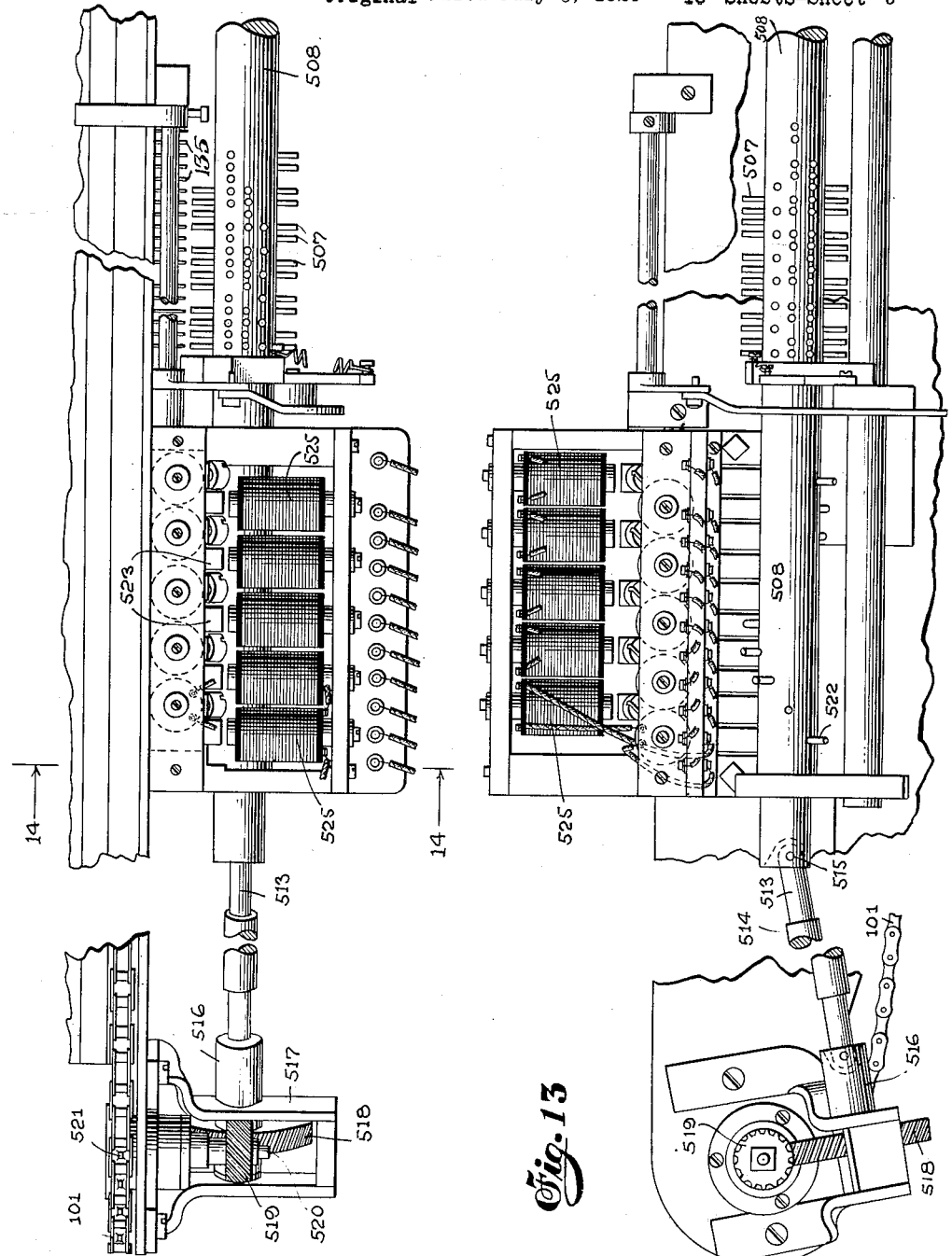

Feb. 2, 1926.  
W. FELS  
1,571,765  
PATTERN CHANGE MECHANISM FOR KNITTING MACHINES  
Original Filed July 8, 1920  13 Sheets-Sheet 9
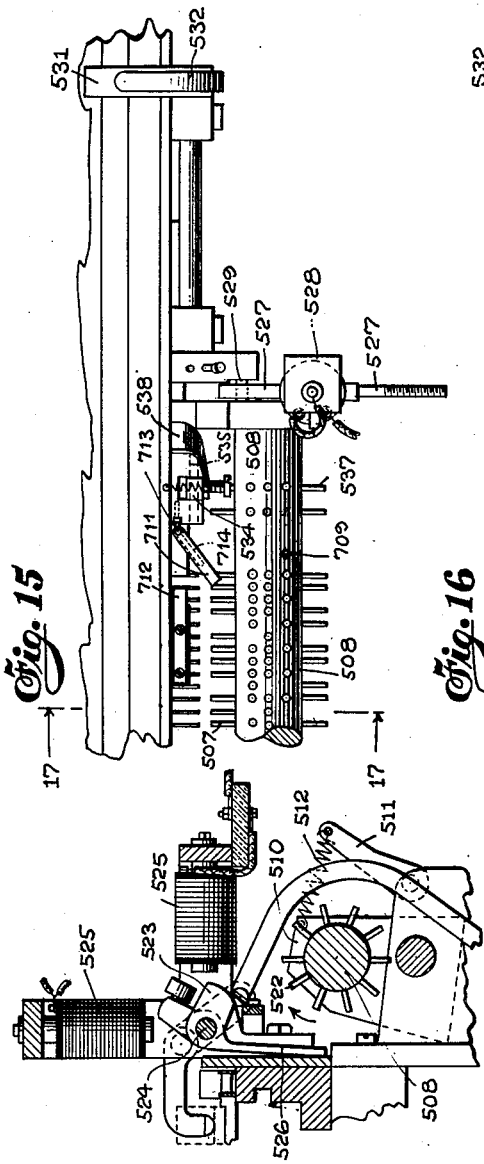
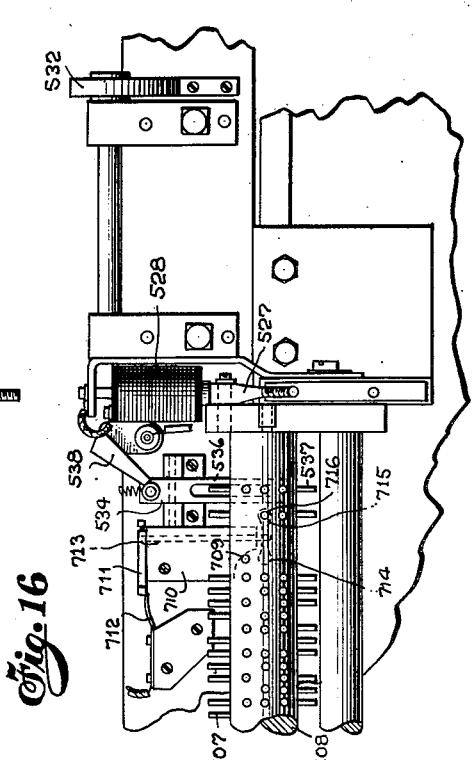
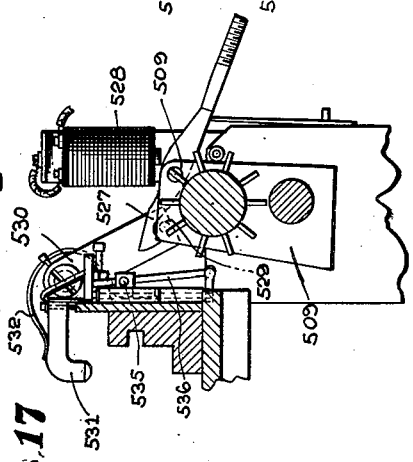
Inventor  
William Fels  
By his Attorneys Feb. 2, 1926. 1,571,765
W. FELS
PATTERN CHANGE MECHANISM FOR KNITTING MACHINES
Original Filed July 8, 1920  13 Sheets-Sheet 10
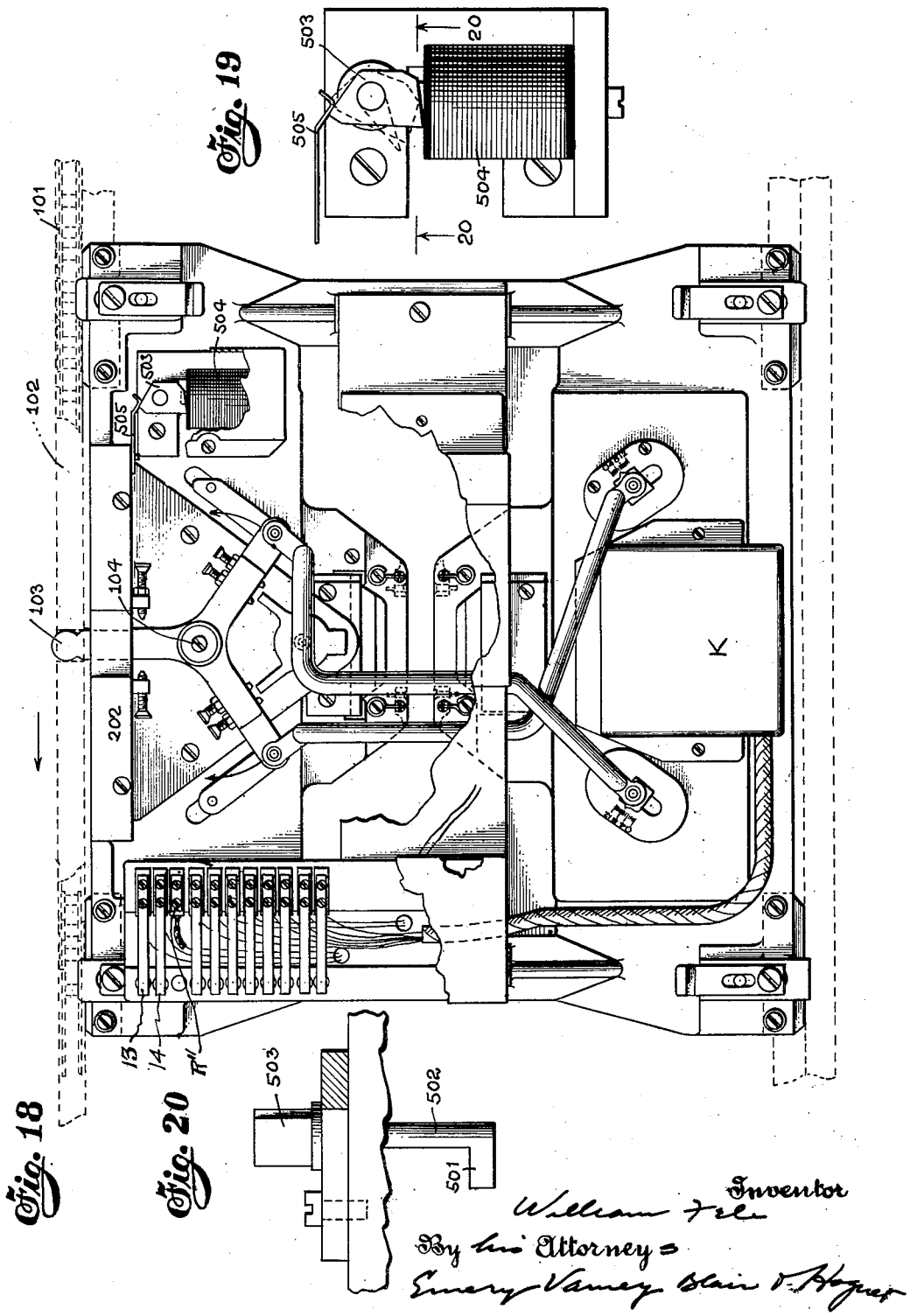

Feb. 2, 1926. 1,571,765
W. FELS
PATTERN CHANGE MECHANISM FOR KNITTING MACHINES
Original Filed July 8, 1920 13 Sheets-Sheet 11

Inventor
William Fels
By his Attorneys
Emery Varney Blair & Hoguet

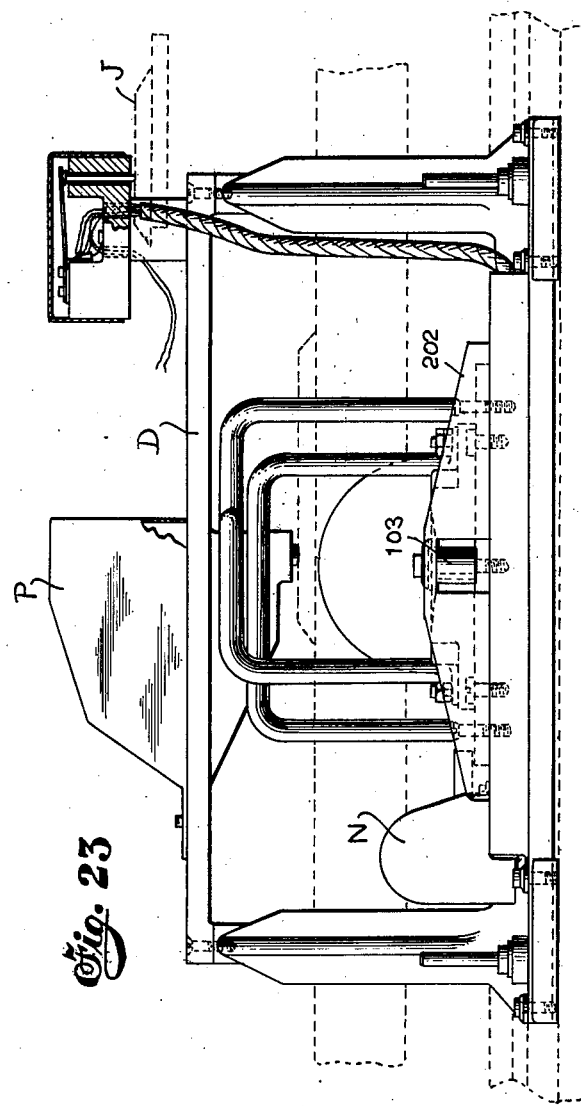

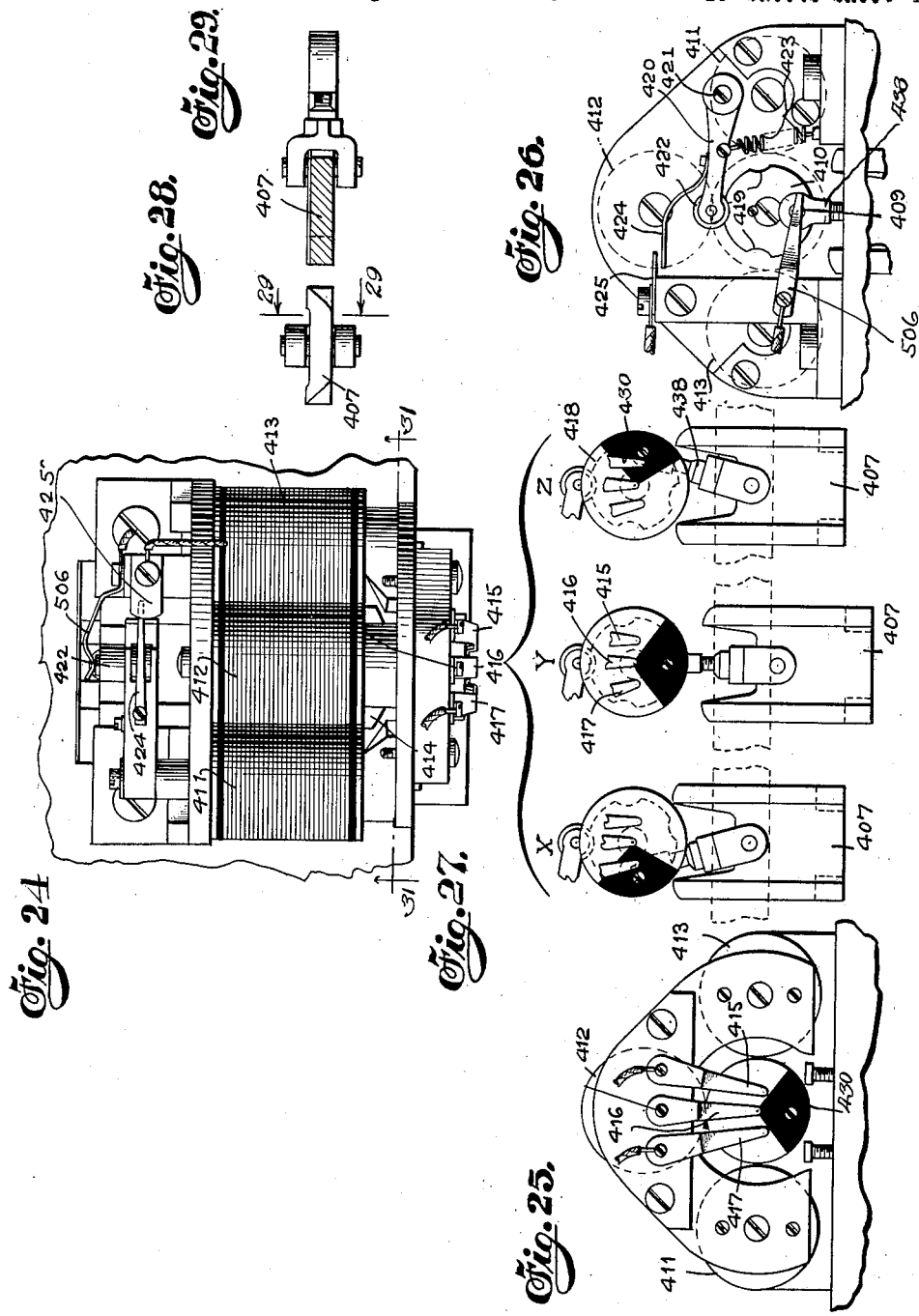

Patented Feb. 2, 1926.

1,571,765

UNITED STATES PATENT OFFICE.

WILLIAM FELS, OF ELIZABETH, NEW JERSEY, ASSIGNOR TO MAX NYDEGGER, OF ELIZABETH, NEW JERSEY.

PATTERN-CHANGE MECHANISM FOR KNITTING MACHINES.

Application filed July 8, 1920, Serial No. 394,678. Renewed September 10, 1925.

*To all whom it may concern:*

Be it known that I, WILLIAM FELS, a citizen of Austria, residing in Elizabeth, county of Union, and State of New Jersey, have invented an Improvement in Pattern-Change Mechanism for Knitting Machines, of which the following is a specification.

The present invention relates to an improvement in knitting machines. One object has been to provide a machine which shall be fully automatic and at the same time of relatively simple construction with a minimum of mechanically controlled and actuated parts. A further object has been to provide relatively simple means for preventing injury to the machine in case of careless or erroneous operation.

It is known that knitting machines, automatic in varying degrees, have been devised but these machines are usually of complicated design and involve a multiplicity of mechanical movements which not only make the machine expensive to manufacture, but also cause frequent breakdowns and make it necessary for the operator to devote considerable attention to repairs and adjustments.

According to the present invention, I utilize substantially the well known framework and opposed front and rear needle beds of a flat links links machine, although I do not intend to limit the application of the present invention to machines of this type, it being contemplated that the same or similar principles of operaion may be applied to other types of knitting machines with suitable modifications. In connection with the flat double bed machine, I use stitch forming means including a reciprocating carriage automatically reversible in direction and which carries with it suitable means for effecting changes in the positions of the jack actuating cams to produce corresponding changes in the stitch length, also cam positioning means for controlling the action of the needle jacks to produce either flat or links links operation according to a predetermined order, and also means for engaging and disengaging a plurality of thread carriers to vary the color scheme of the fabric according to a predetermined arrangement.

Cooperating more particularly with the links to flat change portion of the mechanism arranged on the carriage, is a jack engaging device for automatically selecting jacks or combinations of jacks and moving them into and out of operative position. This device may conveniently be referred to as a jacquard and is intended to perform automatically, and without stopping the machine, substantially the same functions which are now commonly performed only by hand in the case of knitted fabrics of complicated design.

Further elasticity in the operation of the machine and in the character of the fabric produced is permitted by the provision of racking mechanism arranged to operate only in conjunction with or subsequent to a predetermined arrangement of the jacks and needles, said arrangement and said racking being effected automatically and without stopping the machine.

It is contemplated that all or part of the functions or operations hereinabove referred to and relating to pattern variation may be controlled automatically and by electrical means through the instrumentality of a suitable pattern chart having perforations arranged in the path of contacts, said contacts forming part of electrical circuits connected with and controlling the operation of various change mechanisms of the machine. Thus, the chart may be rotated around the periphery of a drum in such a way that perforations will occur in predetermined relative positions in the path of the contacts and at the proper time to effect corresponding changes in the operation of the machine and thus in the pattern of the fabric.

One embodiment of my invention is illustrated in the drawings accompanying the present specification, and in which—

Figure 1 is a front elevation,
Figure 2, a rear elevation,
Figure 3, a top plan view,
Figure 4, an end elevation showing the driving motor,
Figure 5, a transverse vertical section on the line 5—5 of Figure 3,
Figure 6, an end elevation showing the arrangement of the jacquard and of the electrical pattern control chart,
Figure 7, a diagrammatic representation of a portion of the electrical pattern control system,
Figure 8, a diagrammatic representation of a further portion of the electrical pattern control system more particularly related to the operation of the jacquard.

Figure 9, a detail fragmentary view of the pattern control chart and cooperating contacts, Figure 10, a detail view partly in vertical section of the pattern control chart and contact making and breaking mechanism associated therewith, Figure 11, a top view of the contact making and breaking mechanism associated with the pattern control chart, Figure 12, a top plan view showing details of jacquard positioning mechanism, Figure 13, a side elevation of the same, Figure 14, a transverse vertical section on the line 14—14 of Figure 12.

Figure 21:
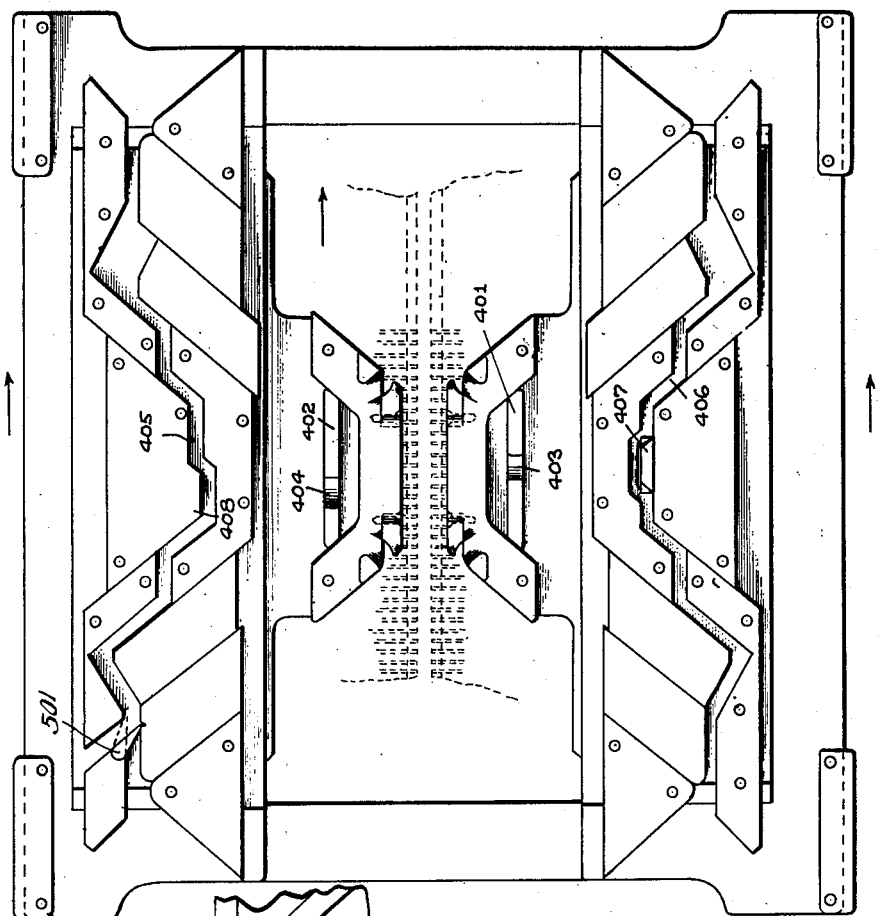
Figure 22:
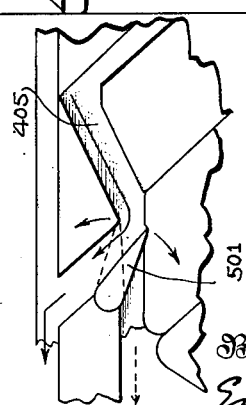

Figure 15, a top plan view of the jacquard actuating mechanism and safety devices associated therewith, Figure 16, a rear view of the same, Figure 17, a transverse vertical section on the line 17—17 of Figure 15, Figure 18, a top plan view of the reciprocating carriage with portions broken away to disclose details of construction, Figure 19, a detail in plan of the jack switch operating mechanism, Figure 20, a fragmentary detail partly in vertical section of the same, said section being on the line 20—20 of Figure 19, Figure 21, a bottom plan view of the reciprocating carriage, Figure 22, a fragmentary view showing the position and indicating the operation of the jack switch, Figure 23, a side elevation of the carriage with portions broken away, Figure 24, a detail in plan of the vertically moving cam controlling and actuating mechanism, Figure 25, a detail end view of the same, Figure 26, a detail view of the opposite end of the same, Figure 27, details showing different phases of operation of the vertically moving cam, Figure 28, a bottom plan view in detail of the vertical cam, Figure 29, a side view in partly vertical section on the line 29—29 of Figure 28, Figure 30, a diagrammatic representation of a portion of the power circuit including circuit breaking stop means and Figure 31, a section on the line 31—31 of Figure 24.

Referring to the drawings, a machine embodying my invention may conveniently comprise a framework A supporting a fixed rear needle bed B and a front needle bed C preferably slidable both longitudinally and laterally (Figure 3), said needle beds being of the usual type with the needle grooves of one bed registering with corresponding needle grooves in the other bed and equipped with needle operating jacks slidable in said beds and engaging a set of needles having a hook at each end. A reciprocating carriage D is arranged above the needle beds B and C, said carriage being driven by any suitable means such as a motor E operatively connected to a drive chain 101, said chain having a slotted member 102 adapted to receive and engage the free end 103 of a lever pivotally mounted on the carriage at 104 (Figures 3 and 18). As shown more clearly in Figures 1 and 2, the chain 101 is mounted on sprockets arranged at opposite ends of the machine, said sprockets being driven by a belt or other connection with the motor E. To effect the reciprocating motion of the carriage, means are provided for periodically reversing the direction of the current through the armature of the motor thus reversing the direction of the chain 101. To accomplish this reversing operation automatically, a reversing switch is interposed in the power circuit, said switch being controlled by a double relay indicated at F in Figure 7 of the drawings, the opposed magnets of which are alternately energized at the end of each run of the carriage, the circuit being closed through suitable contacts mounted on the framework of the machine and on the carriage respectively. However, before reversing the current in the armature of the motor, it is desirable to reduce the current or otherwise impede the movement of the carriage so as to avoid harmful impact thereof at the ends of its course. As shown in Figure 7, the motor circuit includes the conductors 105 and 106, the latter of which contains a resistance 107 and also a parallel resistance or rheostat 108. Thus, to increase the resistance in the conductor 106, the rheostat 108 may be periodically cut out. This is conveniently accomplished by means of a relay including a magnet 109, and a bar 111 said magnet being in circuit with both magnets of the double relay F and also with the fixed contact R at one end of the machine, an adjustable contact R' at the opposite end of the machine, and a movable circuit closing contact R'' mounted on the carriage D. For practical purposes, the magnet 109 and the double relay may operate substantially simultaneously. However, the action of the double relay may be effectively delayed by making the bar 110 thereof heavier than the bar 111. Thus, the current in the motor E will be reduced either simultaneously with or just before the change of direction of the current therein.

In addition to the automatic features associated with the driving and stopping of the knitting machine, I have also provided automatic means for controlling and actuating in predetermined succession those parts of the device which operate more particularly to form the fabric and to govern the character of the pattern thereof. This automatic control is effected through a combination of electrical and mechanical arrangements which are measurably simpler than those commonly utilized for a similar purpose in the knitting art and, at the same time effect a highly desirable uniformity and certainty of operation. The control apparatus, according to my invention, cooperates with the driving mechanism in such a manner that the necessary changes of the various parts are effected at the proper time to secure the desired design of fabric and also to prevent injury to the machine, the latter result being accomplished through the instrumentality of suitable safety devices hereinafter to be referred to in detail in connection with the movements with which they are more particularly associated. The general scheme of control includes a system of circuits each having one set of contacts which engage to close the circuit periodically and another set of contacts which engage according to a predetermined arrangement, so that no change is effected unless both sets of contacts are in engagement simultaneously. Referring to Figures 3 and 7 of the drawings, the periodically operating contacts are represented at H, J and K, the contacts H being fixed at one end of the machine, the contacts J being slidably mounted at the other end of the machine, so that the length of stroke of the carriage may be varied, and the contacts K being mounted on the carriage to reciprocate therewith. Thus, some of the contacts K engage all of the contacts H at each stroke toward the left end of the machine, while some of the contacts K engage all of the contacts J at each stroke toward the right end of the machine. All of the contacts H and J are in circuit with a rotating drum 201, the details of which are more clearly disclosed in Figures 9 to 11 inclusive. Intermittent movement is imparted to the drum 201 by suitable means connected with the reciprocating carriage and operated thereby. Thus, the carriage is provided with an upwardly projecting cam shaped member 202 (Figure 3) which moves in the path of a lever 203 (Figures 5 and 6) and deflects one end of said lever upwardly. This lever 203 is securely fastened to a rod 204 (Figure 3) journaled in the framework of the machine and having a lever, arm 205, Figure 5, secured at one end. A link 206 pivoted at 207 imparts a rocking motion to a shaft 209 upon which is secured a pawl carrier 208 (Figure 10). A pawl 210 mounted on carrier 208 is held by means of a spring 230 in engagement with a ratchet 211 which is operatively connected to the drum 201 and imparts intermittent movement to said drum to the extent of one step during each stroke of the carriage. A contact carrier 212 is mounted adjacent to the drum 201 and is provided with a plurality of perforations adapted to accommodate plunger contacts 213 normally pressed toward the drum by means of springs 214. The carrier 212 is pivotally mounted at 215 and is connected to the pawl carrier 208 by means of a link 216. A spring 217 may be provided to hold the contact carrier normally in position to permit the plunger contacts 213 to engage the peripheral surface of the drum 201 through pattern controlling perforations hereinafter referred to, or, in the absence of perforations to engage the surface of a pattern chart 218 arranged to cover the surface of said drum. A yielding detent 219 engages the ratchet 211 to prevent lost motion. As indicated in Figure 9, the pattern chart 218 is provided with perforations 220 which receive corresponding sprocket projections 221 extending from the peripheral surface of the drum 201. The surface of the chart may be provided with transverse and longitudinal markings 231 and 232 respectively by which the pattern controlling perforations 222 and 223 may be more readily located and identified as to function. In the embodiment of my invention illustrated in the drawings, the pattern chart will move twice between each two of the perforations 220. In other words, the pattern chart will travel a distance equal to the distance between two perforations 220 during a complete oscillation of the carriage D, but the movement will take place in two increments. Thus, a change perforation 222 occurring on the same transverse line with the perforations 220 will indicate a change to be effected at the end of a run of the carriage in one direction while a change perforation 223 indicates a change to be effected at the end of a run of the carriage in the opposite direction.

In operation, the plunger contacts 213 normally bear yieldingly against the surface of the pattern chart 218 or against the drum 201 when the perforations 222 and 223 come into register with said plunger contacts, the latter in this position extending through said perforations, and, in each case, closing a circuit. The operation of rotating the drum takes place intermediate the ends of the carriage runs so that, when the carriage reaches one end or the other of its course, one or more pattern or other changes will take effect, depending upon the number and identity of perforations through which the plungers 213 are properly projecting into contact with the drum 201.

Simultaneously with the rotary movement of the drum caused by movement of the pawl 210 I raise one end of the contact carrier 212 by means of the link 216 connected with the pawl carrier 208 and against the tension resistance of the spring 217. This raising of the carrier elevates the contacts 213 out of engagement with the drum or the pattern sheet, as the case may be, and serves to prevent sparking at the points of the contacts 213 upon making and breaking contact with the drum, as well as to prevent possible injury to the pattern sheet by the dragging of the points during rotation of the drum.

For convenience, the various change circuits may be identified on the pattern chart by number or by reference to the character of the change effected, or by both. Thus, as shown in Figure 9, the numbers 1 to 10 inclusive are intended to identify circuits which effect operation of the jacquard change or that part of the knitting machine mechanism which controls to some extent the combining of the needles in certain relationships to produce patterns of predetermined appearance. Circuit 11 cooperates with what may be called a jack switch, the function of said switch being to throw all of the jacks out of operation prior to a readjustment of the needles through their corresponding jacks by means of the jacquard mechanism. The circuit marked 12 indicates a stop. However, in the present embodiment of my invention, this circuit is not complete because there is little reason for providing a predetermined stop in a full automatic machine except perhaps to indicate the completion of a given piece of knitted fabric. Ordinarily, the operator observes when the pattern has been finished and stops the machine by hand. Circuits 13 and 14 are intended to control the racking mechanism. Circuits 15 and 16 control the operation of a vertically moving cam arranged on the carriage to produce what are known in the art as links links operation and flat operation, respectively. Circuits 17 and 18 include magnets which cooperate with the stitch change mechanism to control the length of the stitch. The three positions herein provided for result in long, medium and short stitches, respectively. The circuits 19 and 20 control the yarn changes and are sufficient to permit the convenient use of three yarn or thread carriers in any desired succession.

In machines of the flat bed type, it is desirable to provide for both links links and flat operation thus giving a wide variety to the fabric patterns which may be formed on the machine. For this purpose, I have included in the knitting machine embodying my invention suitable jack engaging members and means for controlling the longitudinal and vertical needle operating movement of the jacks. Referring to Figure 21, which shows the bottom surface of the cam carriage, cam surfaces 401 and 402 are arranged to ride over portions of the jacks, normally depressing the same into needle engaging position, it being understood that double ended buttless needles are provided to move back and forth in the needle grooves of the needle beds and that suitable jacks having needle hook engaging ends are also provided in the grooves to engage, disengage, and move the needles according to the requirements of the pattern of the knitted fabric. Adjacent to the cam surface 401 is a recessed portion 403. A similar recessed portion 404 lies adjacent to the cam surface 402, said recessed portions permitting the jacks to move up out of needle engaging position. It will be noted that the fixed cams lying adjacent to the rear needle bed of the machine will form a cam groove 405 while the fixed cams lying adjacent to the front needle bed will form a cam groove 406, said grooves cooperating in the well known way with the jack butts to move the jacks forward and back in their corresponding grooves in the needle beds. When the needles are positioned in one of the beds, they will normally be in contact only with the jacks belonging to that particular bed. However, where it is desired to interchange the needles from one bed to another for the purpose of changing the pattern, or the appearance of the knitted fabric, or for some other purpose, means may be provided to move the needles in one bed toward the center and into such a position that under some circumstances the jacks in the opposite bed will engage the free end of the needles to move the same immediately after the jacks in the other bed have been disengaged therefrom. This result may conveniently be controlled entirely from one side of the machine, preferably by means of a suitable cam cooperating with the jacks in the front bed. For this purpose, I have provided a vertically slidable or plunger cam 407 adapted to project, when operative, into the cam groove 406. A similarly shaped fixed cam 408 forms a part of the cam system cooperating with the rear bed of the machine and is equivalent to the cam 407 in every respect except that it is not removable or adjustable. Thus at every links passage of the carriage or movement toward the left, the cam 408 thrusts the jacks and the needles forward into such position that the needles can be engaged by jacks in the front bed if said jacks are thrust forward sufficiently for the purpose. This is the function of the vertically slidable cam 407. When this cam is out of operation on links passage of the carriage, the jacks in the front bed do not engage the free end of the needles in the rear bed and therefore said needles are not drawn across into the front bed. However, when the cam 407 is moved into position in the cam slot 406, the jacks in the front bed are moved forward sufficiently to engage the free ends of the needles of the rear bed and said needles are withdrawn from said rear bed, but only when the carriage is moving in the direction indicated by the arrow. When moving in the opposite direction, the same positioning of cam 407 will cause the needles in the front bed to be moved into the rear bed. The operations thus far referred to generally in connection with changes from links links to flat and vice versa are carried out in principle by the knitting machines in common use. However, according to my invention, I provide a novel and relatively simple and effective control over the movement of cam 407 so that changes in the position of said cam required by the pattern may be automatically and accurately brought about by electrical means.

Referring now to Figures 24 to 29 inclusive and 31, the cam 407 may be supported on a link 438 pivotally mounted on an eccentric crank pin 409 projecting from the surface of a disc 410, said disc being attached to a rotating armature associated with magnets 411, 412 and 413, said armature being indicated at 414 (Figure 24). According to the present construction, the mechanism controlling cam 407 is capable of three positions illustrated at X, Y and Z in Figure 27. The X position is brought about when coil 413 is energized, the Z position when coil 411 is energized, and the Y position when the flow of current is through coil 412. The X and Z positions produce what is called flat operation, while the Y position produces the links links operation or that positioning of the cam 407 which causes the needles to be shifted from one bed to the other. This mechanism is indicated diagrammatically in Figure 7 at M, in accordance with which, the circuit 15 controls magnet 411 but energizes said magnet only when the contact is closed at the left hand end of the machine or in the H group of fixed contacts. A similar circuit 15 is closed to energize magnet 413 when the carriage reaches the right end of its run, assuming in each case that a corresponding perforation in chart 218 permits the complete closing of the circuit through the control chart in the manner hereinabove explained generally. The magnet 412 may be energized at either end of the course of the carriage and is connected with the circuit 16 which includes not only the conductors indicated diagrammatically in the drawing (Figure 7) but also a plurality of spring contacts 415, 416, and 417. A metallic insulated contact plate 418 is mounted to rotate on the same center as the disc 410 but at the opposite end of the rod or member supporting both said disc and the armature 414. The contact plate 418 has a sector shaped recess arranged to expose a surface 430 of fibrous or other insulating material underlying the plate and therefore in the path of the contacts 415 and 417, depending upon which of the coils is energized. Thus, when the parts are in the position shown in Figure 7 or in the links links position, a perforation occurring in the control chart along the line of circuit 15 will close said circuit and thus energize one of the magnets 411 or 413. Assuming that the magnet 411 is energized and that the parts now assume the position Z of Figure 27, it will be clear that magnet 412 cannot be energized when the carriage is at the right hand extremity of its course because the contact 415 will be resting upon the surface 430 of the fibre insulating material underlying the contact plate 418, even though a perforation occurs in the line of the circuit 16. In order, therefore, to move the cam 417 back to links links position, it will be necessary to have a perforation in the circuit 16 occurring at such a place on the control chart that the circuit 16 will be completed at the left hand extremity of the course of the carriage. This arrangement is intended to eliminate the possibility of erroneous or untimely operation of the cam 407. When the machine operator discovers that a perforation has been misplaced and is therefore inoperative, as will be evidenced by a corresponding mistake in the resulting fabric pattern, he may, on his trial run, indicate such errors and correct the pattern control chart by pasting up or otherwise closing the wrong perforation and also by inserting additional perforations in their correct places.

By reason of the character of the operations set in motion by the movement of cam 407, it has been found desirable to interpose safety devices in such a manner that, unless a proper predetermined movement of cam 407 takes place, further operation of the machine will be prevented. In other words, if cam 407 should fail for some reason to perform its function according to proper knitting practice, it is likely that serious injury might result to the machine if the succeeding operation were permitted to be initiated. Even if no injury came to the machine, it is possible that there would be an error in the knitted fabric. One of such safety devices is associated with the disc 410. Referring to Figures 7 and 26, this disc is shown with a plurality of peripheral notches or depressions 419, one notch being provided for each position of the contact plate 418, as indicated in Figure 27. A lever 420 pivoted at 421 has a roller 422 mounted at its free end and positioned to engage the peripheral surface of the disc 410, said roller being retained in yielding engagement with said surface by means of a spring 423. The lever 420 also carries adjacent to its free end a contact 424 which is movable toward and away from a fixed contact 425. In operation, when the disc 410 is rotated by reason of the energizing of one of the magnets 411, 412 or 413, the roller 422 rides up on the cylindrical surface of the disc and closes the contacts 424—425. However, as soon as the change is completed and the roller 422 comes to rest in contact with one of the notches or recesses 419, the contact 424—425 is again broken. These contacts may be included in one of the circuits indicated diagrammatically in Figure 30, and any one of which, when closed, will break the power circuit through operation of the relay G. Thus, if for some reason the change of position of cam 407 from position Y to position X should not be entirely completed, the roller 422 would still be riding on the cylindrical peripheral surface of the disc 410 and the contact 424—425 would be closed, thus energizing the magnet 113 of relay G, and if all other settings and adjustments were correct, the machine would stop and the safety signals would indicate an incorrect functioning in connection with cam 407. Since the change hereinabove described takes place at the end of a run of the carriage, the momentary closing of contacts 424—425 in normal operation will produce no perceptible effect on the operation of the machine.

I have previously referred to the jacquard or the mechanism for grouping, according to a predetermined plan, the jacks in the rear needle bed in such a manner that some or all of said jacks may be thrown into operative needle engaging position in their respective grooves. Before a rearrangement takes place, however, it is necessary to move the disengaged jacks in the rear needle bed from working position toward the rear of the bed. Th s operation is accomplished by means of mechanism which I have identified generally in Figure 7 at N and which may conveniently be referred to as the jack swit h mechanism, the mechanical features of which are more clearly shown in Figures 18 to 22 inclusive. Referring to Figure 22, the actual jack engaging portion of the mechan sm includes a switch or cam 501 interposed in the cam groove 405 in the path of the jack butts, said switch being secured to the lower end of a rod 502 (Figure 20), the upper end of which carries an armature 503 (Figure 19) positioned to cooperate with the core of a magnet 504. A yielding latch 505 engages flat surfaces of the armature 503 to retain said armature in on and off positions, respectively. Referring now to Figure 7, the magnet 504 is energized through the circuit having the contacts 11, one of which is mounted on the reciprocating carriage of the machine, and the other of which is included in the group of contacts J, or those positioned at the right hand end of the machine. Thus, the energizing of magnet 504 can take place only at one end of the machine and when a perforation occurs in the control chart at the proper place to effect this result. Furthermore, the energizing of magnet 504 cannot take place unless the cam 407 is in position to effect links links operation of the machine, indicated in Figure 27 as position Y. In a full automatic machine this result is accomplished by interposing a contact 506, Figure 7, in the circuit 11, said contact being arranged in the path of the crank pin 409 on disc 410, Figure 26, and in engagement with said crank pin or a contiguous part only when cam 407 is in the Y, or links links position. In all other positions, these contacts are out of engagement and the jack switch circuit is open. Obviously a similarly effective movement of the cam 407 may be made by mechanical means or by hand.

The mechanical features of the jacquard mechanism are more clearly shown in Figures 12 to 17 inclusive. By means of the apparatus therein illustrated, the jack selecting or jack pushing members, arranged in predetermined combinations on a suitable shaft or cylinder, are rotated alternately in opposite directions until a particular combination is selected by the mechanism here inafter described and provided for the purpose. The shaft or cylinder carrying the jack engaging or jack pushing members is also mounted to be moved toward the jacks after a given combination has been selected by the selecting mechanism. Otherwise, the jack pushing members rotate as stated without being deflected toward the jacks. The jacquard may comprise a plurality of jack pushing members or pins 507, of uniform length and diameter and removably positioned in a cylinder 508 having a plurality of rows of cylindrical recesses of suitable size and shape to receive and retain the pins 507. These pins are preferably provided with longitudinal slots at their lower ends so that, by making the pins and the recesses of substantially the same diameter, the latter will engage said recesses yieldingly and securely. In the embodiment of my invention under consideration, I accommodate ten arrangements of the pins 507 although it is obvious that additional and other arrangements can be made. The cylinder 508 is journaled in a pair of supports 509 and 510, said supports being pivotally mounted on and tiltable with respect to suitable brackets supported by the framework of the machine. An extension 511 mounted upon one of said brackets secures one end of a spring 512, the other end of which is fastened to the support 510, thus normally holding the cylinder 508 and its supports away from the jacks. Rotary movement is transmitted to the cylinder 508 through a universal joint and friction clutch arrangement including a two part shaft 513 having a friction collar 514 overlapping the adjacent ends of the shaft parts. One terminal of said shaft pivotally engages the end of the cylinder 508 at 515 while the opposite end similarly engages the free end of a spur shaft 516 journaled in a bracket 517 secured to the machine, and which carries on its driven end a gear 518, said gear meshing in turn with a pinion 519 mounted on a spur shaft 520 journaled in a portion of the machine and having at one end a sprocket 521 which is driven alternately in opposite directions by means of the power chain 101. Thus, with the universal joint and slip connection between the shaft 516 and the cylinder 508, motion of rotation alternately in opposite directions will be imparted to said cylinder except when said motion is interrupted by the selective stop means hereinabove referred to and to be described.

Referring now to Figures 12 and 13 and 14, the selective stop mechanism will include a plurality of pins 522, each arranged on cylinder 508 in longitudinal alignment with a corresponding row of pins 507. A plurality of armatures 523, one for each pin 522, are rotatably mounted on a rod 524 in such a manner that, when one of the coils 525 corresponding to a given armature is energized, said armature will be rotated around 524, thus deflecting a projecting detent portion 526 into the path of the corresponding pin 522 which position will be maintained until the jacquard throwing mechanism has operated to effect a forward movement of the jacks lying in the path of the pins 507 occurring in the selected row. The energizing of the coils 525 is effected through circuits numbered 1 to 10 inclusive and shown diagrammatically in Figure 8. Thus, when the pattern chart 218 turns a perforation into such position that one of the plunger contacts 213 will project through said perforation and close the circuit, the corresponding magnet 525 will be energized and will move the proper detent into position to stop rotation of the cylinder 508, as hereinabove described.

After the proper arrangement or group of pins 507 has been brought into position by the selecting means described, jacquard throwing or tilting mechanism will be actuated to move the jacquard toward the jacks of the rear needle bed and to push forward some or all of said jacks into operative needle engaging position, according to the requirements of the pattern.

As heretofore described, the pin carrying cylinder 508 is mounted on a pair of supports 509 and 510, said supports being adapted to rock or tilt to move the pins forward into jack engaging position at the proper time. As shown in Figure 17, a latch 527 is pivoted on the support 509 and has a portion adjacent to the core of the magnet 528. The forward or operative end of the latch is preferably of hook shape to engage a lug 529 mounted on a toggle lever 530, one end 531 of which normally lies in the path of the cam 202, forming a part of the carriage D. Thus, at the end of each stroke of the carriage to the left, the member 531 is pressed upwardly against the resistance of a spring 532 and the lug carrying end of lever 530 is deflected a corresponding amount. If the coil 528 is inert the lug 529 will clear the end of the latch 527 and no tilting movement of the cylinder 508 will result. However, if coil 528 is energized, a portion of latch 527 acting as an armature will be moved into engagement with the core of the magnet, thus deflecting the forward or hook end of the latch so that, when the carriage reaches the left hand end of the machine, the resulting movement of the members 531 and 530 will bring said latch into engagement with the lug 529 and the continued forward movement of the member 530 will carry with it the cylinder 508 against resistance of the spring 512. When the direction of the carriage is reversed, the engagement between cam 202 and the member 531 will of course be broken and the parts will return to the inoperative position shown in Figure 17.

Referring now to Figure 8, it will be clear that the energizing of magnet 528 will depend on two factors. In the first place, said magnet will not be energized unless one of the coils 525 has been energized through operation of a suitable perforation occurring in one of the circuits numbered 1 to 10 inclusive. Furthermore, the coil 528 cannot be energized and the jacquard cannot be thrown forward unless the machine is operating links links or, in other words unless circuit 16 is closed. For this purpose, a double relay S is interposed in circuits 15 and 16, a magnet 540 being in circuit 15, and another magnet 541 being in the circuit 16. A stop 542 lies adjacent to magnet 540 while a live contact 543 lies adjacent to the magnet 541. Accordingly, when the machine is operating flat, or when circuit 15 is closed, the current carrying armature 544 of the relay S will engage the stop 542, thus leaving open the circuit which includes the magnet 528. However, if circuit 16 is closed, magnet 541 will be energized and the circuit of magnet 528 will be closed. Where this closing of the circuit including magnet 528 is coincident with a closing of the circuit through one of the circuits 1 to 10 inclusive, the jacquard will be actuated at the proper time so that no injury will result to the machine or to the fabric through a possible mistake in the perforating of the pattern chart.

Another safety device which is intended to prevent accidental operation of the wrong jacks upon the forward thrust of the jacquard includes a movable contact more clearly shown in Figures 15, 16 and 17, said contact consisting of a lever 534 pivoted at 535 (Figure 17). The lower portion 536 of said lever is provided with a slot, more clearly shown in Figure 16, said slot being of slightly greater width than the diameter of the pins 507. A set of pins 537, one for each row of jacquard engaging pins, is arranged on the cylinder 508 in such a manner that, if the jacquard is in normal proper alignment with the rear ends of the jacks in the rear bed, upon the forward thrust of said jacquard, the pins 537, or that one of them which corresponds to the selected row of pins 507, will move into the slot without touching the lower portion 536 of the lever contact. However, if for some reason, the jacquard has been displaced longitudinally to such an extent that one pin might possibly fail to move its corresponding jack upon the forward thrust of the jacquard or might possibly move some jack which it was not intended to move, then one of the pins 537 would press against the downwardly extending member 536, rocking the upper end forward and into engagement with a fixed contact 538, said contact being one of those illustrated diagrammatically in Figure 30 and the function of which is to interrupt the power circuit and stop the machine.

A further automatic pattern changing movement to be considered in connection with the present embodiment of my invention is the racking movement. In the present case, this movement consists in sliding the front bed longitudinally back and forth with respect to the rear bed. The mechanism for accomplishing this movement will be more readily identified in Figures 1 and 3. As shown in Figure 3, the needle bed C has a link 701 pivoted at its extreme left end, the opposite end of said link being pivotally secured to a crank pin 702 eccentrically mounted on a rotatable disc 703, carried on a shaft 704 (Figure 1) to which is also secured a gear 705 meshing with a pinion carried on the shaft of a motor 706. The movement of the parts is such that when current is supplied to the motor in one direction, the front needle bed will be retained in normal operative relation to the rear needle bed. However, when the current in the motor is reversed, the shaft 704 will be rotated to give the disc 703 a half turn, thus imparting endwise movement to the link 701 which causes the needle bed C to slide toward the right hand end of the machine to such an extent that each groove in the front bed will move past one groove in the rear bed.

The direction of the current flowing into motor 706 is controlled by apparatus indicated diagrammatically in Figure 7 at R. The power circuit of motor 706 includes a reversing switch, the movable portion of which is mounted on the armature of a relay having magnets 707 and 708, the magnet 707 being included in the circuit 13 while the magnet 708 forms a part of the circuit 14, both of which are closed according to predetermined plan through the instrumentality of suitable perforations in the control chart 218. It will be noted that the circuits 13 and 14, in the present embodiment of my invention, are closed only at the right hand end of the machine. Furthermore, these circuits cannot be entirely closed unless the jacquard has operated to place the jacks and needles in a certain predetermined relation. In the preferred arrangement, half of the needles will be in the rear bed and the other half will be in the front bed in staggered relation. In other words, a needle in the front bed will lie opposite an open or empty groove in the rear bed and vice versa. This arrangement of the needles is accomplished by selecting that row of pins 507 on the jacquard which will push forward every other jack when the cylinder 508 is rocked forward as previously described. At the same time, this forward movement of the pins actuates a switch 711 which closes the circuits 13 and 14 and permits them to operate. The mechanical aspects of this feature of my invention are more clearly shown in Figures 15 and 16. That row of pins on the jacquard which will push forward every other jack, or the "one and one" row, is in alignment with a single pin 709. Secured to the framework of the machine is a bracket 710 carrying a movable contact or switch 711, the free end of which cooperates with a fixed contact 712 arranged adjacent thereto. The contact 711 is secured to a rod 713, rotatably mounted on the bracket 710 and carrying on its lower end a lever having arms 714 and 715. The longitudinal axis of this lever is aligned with the butts of the jacks and therefore with the operative ends of the pins 507. When the "one and one" row of pins has been selected by the selecting mechanism hereinabove described, the pin 709 will move forward and engage arm 714 thus deflecting the contact 711 into engagement with contact 712. In order to positively prevent the circuit from being closed by mistake and thus to prevent racking movement at the wrong time, a plurality of pins 716 are arranged on the cylinder 508, one pin being in alignment with each row of pins 507 except the one and one row hereinabove referred to and opposite which is positioned pin 709. When the cylinder is moved forward or toward the rear needle bed, one of the pins 716 will always engage the arm 715 in such a manner that the contact 711 will be deflected out of engagement with the contact 712. With the parts in this position, even though a perforation may inadvertently occur on the control chart in the line of circuits 13 or 14, no racking movement will take place because the relay circuit will be open and the coils 707 and 708 therefore cannot be energized. It is contemplated, moreover, that the motor 706 shall exert a steady pull in the direction required to maintain the front needle bed in the desired position, thus supplying positive means for locking the bed in position when required.

Having described the details of the jacquard, jack cam, racking, and plunger cam mechanisms, it will be noted that these portions of the machine cooperate more particularly to produce pattern variations of the kind depending on changes in the direction of the stitch loops as distinguished from changes in color or in the length of the stitches. Thus, the jacquard selects jacks and moves them into position for effecting a change in the direction of effective stitch forming movement of predetermined needles and the racking mechanism shifts one bed of the machine so that certain predetermined stitch loops are crossed during the formation of the next succeeding row of stitches.

In operation, assuming that the machine is running on a straight pattern and it is desired to change to a pattern having certain stitches reversed in direction, a suitably located perforation on the pattern sheet will close contacts to cause operation of the jack cam thus bringing all the jacks into the rear bed and in position to be engaged by the jacquard selective mechanism. At this point another properly located perforation in the pattern sheet selects the desired combination of jacks to be moved and the jacquard mechanism then operates to push forward the selected jacks. Those which are thus moved forward are in position to engage corresponding needles to draw the same into the rear bed while the jacks in the front bed draw the remaining needles in the opposite direction. Where the pattern requires a racking operation the jacquard will first select every other jack, the next run of the carriage will operate to position alternate needles in opposite beds and then the racking can take place effectively. As long as the needles are in the "one and one" position the racking can take place at the end of each complete oscillation of the carriage thereafter, assuming of course, that an appropriate perforation occurs in the pattern sheet for each direction change, without repeated operation of the jack cam, plunger cam, and jacquard.

From the foregoing description of one embodiment of a knitting machine employing my invention and of the operation of the several parts thereof, it will be clear that the present invention provides a knitting machine, entirely automatic in its operation and capable of producing fabrics of complicated design. The pattern chart for any desired fabric will preferably be worked out by an expert who must be entirely familiar with the machine and with the knitting art generally. To change from one pattern to another, it will be necessary only to remove one chart from the drum and replace it with another chart carrying a different pattern. An important feature of the invention resides in the fact that when embodied in a full automatic machine it practically eliminates the necessity for employing skilled knitters as operators. Moreover, where each machine capable of producing fabrics of complicated design has heretofore required practically the entire attention of one skilled knitter, it is contemplated that six automatic machines of the type hereinabove described may be operated simultaneously by a single workman who is not necessarily a skilled worker. In addition to the economy effected in the matter of labor saving, it will be clear that machines of this character can be speeded up to operate with great rapidity and that the output will be relatively large because of the continuous operation of the machine, there being no stops required for changes by hand.

Further advantages in the use of the machine reside in the safety appliances in connection with the operation of which it is impossible for the several parts of the machine to function incorrectly or out of their proper order. Where an error does occur in the pattern control chart, which if committed would injure the machine or injure the fabric, the machine is stopped and a signal indicates the source of trouble. Other advantages flowing from the application of the present invention will be obvious from a consideration of the description of the parts and their method of operation.

I claim as my invention:

1. In a knitting machine, the combination of a needle bed having jacks slidably arranged therein and means for automatically advancing jacks from inoperative to operative needle actuating position, including a plurality of rows of jack advancing members mounted on a rotatable carrier, means for arresting rotation of said carrier to selectively position any one of said rows opposite the jacks independently of the relative positions of said rows on the carrier, and means for moving said carrier toward the jacks.

2. In a knitting machine, the combination of a needle bed having jacks slidably arranged therein and means for automatically advancing jacks from inoperative to operative needle actuating position, including a plurality of rows of jack advancing members mounted on a rotatable carrier and projecting radially therefrom, means for arresting rotation of said carrier to selectively position any one of said rows opposite the jacks and means for moving said carrier toward the jacks.

3. In a knitting machine, the combination of a needle bed having jacks slidably arranged therein and means for automatically advancing jacks from inoperative to operative needle actuating position, including a plurality of rows of jacks advancing members mounted on a rotatable carrier and extending radially from its peripheral surface, and means for selectively positioning any row of said members independently of the sequence of said rows on the carrier, comprising a stop on said carrier for each row and a detent arranged normally adjacent to the path of rotation of said stops and selectively releasable into effective stop engaging position.

4. In a knitting machine, the combination of a needle bed having jacks slidably arranged therein, a reciprocating cam carriage cooperating with said bed and means for moving jacks from inoperative to operative needle actuating position including a plurality of rows of jack advancing members mounted on a rotatable carrier, means for effecting complete rotation of said carrier during each run of the cam carriage, and means for arresting rotation of the carrier during said run of the carriage to selectively position a predetermined row of jack advancing members, and means operative at the end of a run of the carriage to move the carrier toward the jacks.

5. In a knitting machine, the combination of a needle bed having jacks slidably arranged therein, a reciprocating cam carriage, driving means for said carriage, and means for moving jacks in the needle bed from inoperative to operative needle actuating position, including a plurality of rows of jack advancing members radially mounted on a rotatable carrier, driving means for effecting complete rotation of said carrier during each run of the cam carriage, means for selectively stopping rotation of the carrier without arresting the driving motion of the carrier driving means, and means operative at the end of a run of the carriage to move said carrier toward the jacks.

6. In a knitting machine, the combination of a needle bed having jacks slidably arranged therein, a reciprocating cam carriage, driving means for said carriage, and means for moving jacks in the needle bed from inoperative to operative needle actuating position, including a plurality of rows of jack advancing members radially mounted on a rotatable carrier, driving means for effecting complete rotation of said carrier during each run of the cam carriage, means for stopping the movement of said carrier during said run of the carriage and at any predetermined phase of rotation to position a row of jack advancing members for effective jack engaging operation and means for moving the carrier toward the jacks.

7. In a knitting machine, the combination of a needle bed having jacks slidably arranged therein, a reciprocating cam carriage, driving means for said carriage, and means for moving jacks in the needle bed from inoperative to operative needle actuating position, including a plurality of rows of jack advancing members mounted on a rotatable carrier and extending radially from the peripheral surface thereof, a stop on said carrier for each of said rows, a detent normally positioned adjacent to the path of each stop and having an electrically sensitive portion forming the armature of a magnet, an induction circuit for each magnet, and means for selectively closing any one of said circuits to move a corresponding detent into the path of movement of its adjacent stop.

8. Jacquard mechanism for knitting machines, including a rotatable carrier having a plurality of jack advancing pins arranged in longitudinally extending rows and projecting radially from the peripheral surface of the carrier, a plurality of stops projecting from the peripheral surface of the carrier, and detent means normally disengaged from said stops and selectively movable into stop engaging position.

9. In jacquard mechanism for knitting machines, the combination of a rotatable carrier having a plurality of jack advancing members arranged in longitudinally extending rows, means for rotating said carrier, including a friction clutch, a magnetic circuit for each row and detent means operative upon closing of any one of said circuits to arrest rotation of the carrier during continued driving movement of the carrier rotating means.

In testimony whereof, I have signed my name to this specification this 21st day of June 1920.

WILLIAM FELS.